(12) United States Patent
Kitamura

(10) Patent No.: US 9,077,162 B2
(45) Date of Patent: Jul. 7, 2015

(54) HOLDING STRUCTURE FOR OPTION CONNECTOR

(71) Applicant: Sumitomo Wiring Systems, Ltd., Yokkaichi, Mie (JP)

(72) Inventor: Kazuhiro Kitamura, Yokkaichi (JP)

(73) Assignee: Sumitomo Wiring Systems, Ltd. (JP)

(*) Notice: Subject to any disclaimer, the term of this patent is extended or adjusted under 35 U.S.C. 154(b) by 41 days.

(21) Appl. No.: 13/971,967

(22) Filed: Aug. 21, 2013

(65) Prior Publication Data

US 2014/0061398 A1 Mar. 6, 2014

(30) Foreign Application Priority Data

Aug. 28, 2012 (JP) ................................. 2012-187219

(51) Int. Cl.
| | |
|---|---|
| *F16L 3/08* | (2006.01) |
| *H02G 3/02* | (2006.01) |
| *H02G 3/32* | (2006.01) |
| *H01R 13/60* | (2006.01) |

(52) U.S. Cl.
CPC . *H02G 3/02* (2013.01); *H02G 3/32* (2013.01); *H01R 13/60* (2013.01); *H01R 2201/26* (2013.01)

(58) Field of Classification Search
CPC ........... H02G 3/02; H02G 3/32; H01R 13/60; H01R 2201/26

USPC ................... 248/65, 71, 72, 74.1, 75, 300, 56
See application file for complete search history.

(56) References Cited

U.S. PATENT DOCUMENTS

| | | | | |
|---|---|---|---|---|
| 2,534,690 | A | * | 12/1950 | Young, Jr. et al. ............ 248/68.1 |
| 4,163,372 | A | * | 8/1979 | Frye et al. .................... 62/259.1 |
| 6,494,523 | B2 | * | 12/2002 | Kobayashi .................... 296/155 |
| 6,499,702 | B2 | | 12/2002 | Kamekawa |
| 6,695,621 | B1 | * | 2/2004 | Wang .............................. 439/35 |
| 7,500,644 | B2 | * | 3/2009 | Naudet et al. ................. 248/68.1 |
| 7,772,946 | B2 | * | 8/2010 | Oh et al. ......................... 335/219 |
| 8,291,551 | B2 | * | 10/2012 | Bruss et al. .................... 24/16 R |
| 8,410,365 | B2 | * | 4/2013 | Ogawa et al. ............... 174/72 A |
| 8,563,866 | B2 | * | 10/2013 | Oga et al. ....................... 174/135 |
| 2010/0283287 | A1 | | 11/2010 | Toyozumi et al. |

FOREIGN PATENT DOCUMENTS

JP 11-026059 1/1999

* cited by examiner

*Primary Examiner* — Amy Sterling
(74) *Attorney, Agent, or Firm* — Gerald E. Hespos; Michael J. Porco; Matthew T. Hespos

(57) ABSTRACT

A holding structure is provided for an option connector that is mounted at an end of a branch line of a wire harness of a vehicle. A fixing part is defined at an area of the branch line separated from the option connector by a predetermined distance. A holding part is provided on a peripheral component of the vehicle that is in a vicinity of the wire harness. The holding part is configured for releasably holding the fixing part of the branch line so that a tip area of the branch line that begins at the fixing part and includes the option connector extends out from the holding part.

20 Claims, 5 Drawing Sheets

HOLDING STRUCTURE FOR OPTION CONNECTOR

BACKGROUND

1. Field of the Invention

The invention relates to a holding structure for an option connector provided at the end of a branch line branching out from the trunk line of a wire harness arranged in a vehicle.

2. Description of the Related Art

A wire harness for an automobile has a trunk line configured by a bundle of many electrical wires. Branch lines made up of a predetermined group of electrical wires then branch out from the trunk line. A connector that enables electrical connection with an in-vehicle electrical component or the like is provided at the end of the electrical wires in each branch line. An option connector may be provided at the ends of certain branch lines. The option connector is not used in standard specifications, but optionally can be used depending on the vehicle grade and the user's needs after purchase. JP H11-26059A discloses an option connector that is held against the outer circumferential face of the trunk line of the wire harness by wrapping vinyl tape or a band around the option connector and the trunk line.

The decrease in vehicle size and increase in number of in-vehicle components in recent years has been accompanied by an increase in the number of cases where a sufficient gap between the wire harness and peripheral components cannot be secured. Under such circumstances, an option connector that projects out on the outer circumferential face of the trunk line interferes with peripheral components by invading the area in which they are arranged. Abnormal noise also may occur due to this interference between the option connector and peripheral components.

In view of this, a structure has been proposed in which, as shown in FIGS. 4 and 5 show a proposed option connector 1 that is held against a trunk line 2 at an attachment angle α relative to the central axis of a clip 3 that fixes the trunk line 2 to a vehicle 9. Thus, the option connector 1 is constrained from invading the area in which peripheral components are arranged. Furthermore, the option connector 1 of this proposed structure is covered peripherally by a urethane sheet 4, and then is fixed with vinyl tape 8 or the like so that a bottom face 5 of the option connector 1 is brought into contact with a side face of the trunk line 2, and two side faces 6 of the option connector 1 are sandwiched from above and below by the branch line 7 itself.

The proposed structure of FIGS. 4 and 5 may enable the option connector 1 to be held stably in a clearance near peripheral components, and thus may avoid interference with the peripheral components. Also, even if there is interference between the option connector 1 and a peripheral component, damage and abnormal noise can be prevented since the option connector 1 is covered by the urethane sheet 4, and the bottom face 5 and side faces 6 are surrounded by the trunk line 2 and the branch line 7.

However, the task of attaching the wire harness to the vehicle 9 so that the arranged position of the option connector 1 on the trunk line 2 satisfies the attachment angle α relative to the central axis of the clip 3, and also the task of checking the attachment are very troublesome and complicate the attachment task. Also, the operation for fixing the option connector 1 at a predetermined position on the trunk line 2 by winding tape so that the option connector 1 is surrounded by the urethane sheet 4 and the branch line 7 is very complicated, and adversely affects wire harness productivity as well.

Furthermore, the task of undoing the binding by the vinyl tape 8 or the like to use the option connector 1 is troublesome, and produces discarded material such as the vinyl tape 8 and the urethane sheet 4.

The invention was made in view of the above-described situation, and an object of the invention is to provide a novel holding structure for an option connector according to which an unused option connector provided on a branch line of a wire harness easily can be attached and detached at a predetermined holding position without requiring a troublesome task, and according to which abnormal noise due to interference with a peripheral component is prevented.

SUMMARY OF THE INVENTION

The invention is directed to a holding structure for an option connector that is provided at an end of a branch line of a wire harness arranged in a vehicle. An area of the branch line that is separated from the option connector by a predetermined distance is used as a fixing part, and a peripheral component of the vehicle that is arranged near the wire harness has a holder that holds the fixing part of the branch line. The fixing part of the branch line is held removably by the holder of the peripheral component. A tip area of the branch line that begins at the fixing part and includes the option connector is held so as to extend out from the holder.

The holder for holding the option connector is provided in a peripheral component, not on the trunk line of the wire harness. Accordingly, a holding area for the option connector is not limited to the range of the gap between the wire harness and a peripheral component, as in conventional technology. Rather, a holding location for the option connector encompasses a wider area that includes space in or on the peripheral component. In other words, contrary to conventional thinking, the invention actively utilizes the area of the peripheral component, which had been avoided in the prior art. Therefore a wider range of possible holding areas is secured for the option connector. The invention also avoids the need to manage a strict attachment state such as controlling the holding position of the option connector relative to the central axis of a clip for fixing the trunk line to the vehicle body, as in conventional technology. Hence, the option connector can be positioned with a simple attaching task. For this reason, it is possible to hold the option connector without reducing the wire harness productivity or the ease of attachment to a vehicle.

The fixing part may be defined at an area of the branch line at a predetermined distance from the option connector. Thus, the invention avoids the problematic abnormal noise that could otherwise be produced by contact between the hard resin of the option connector and the holder of the peripheral component.

The distance of the fixing part of the branch line from the option connector may be based on the range of possible motion of the tip area of the branch line that extends out from the holder provided in the peripheral component. For example, the position of the fixing part can be set so that the option connector does not contact the underside of the holder, or the length can be set to avoid contact with a peripheral component other than the holding part. Thus, the invention favorably prevents noise due to contact between the option connector and another member.

The fixing part of the branch line may be held removably by the holder of the peripheral component so that the tip area of the branch line extends out from the holder. Thus, there is no troublesome task of surrounding the connector with the branch line. Rather, the unused option connector is held merely by the simple task of holding the fixing part of the branch line in the holder. Similarly, when the option connector is to be used, there is no troublesome breaking of vinyl tape, and the unused option connector can be used merely by simply removing the fixing part of the branch line from the holder.

Any structure can be used for fixing the fixing part of the branch line and the holder of the peripheral component provided that the fixing part is held removably by the holder. For example, hook-and-loop fasteners may be provided on the faces of the fixing part and the holder that contact one another. The holder alternatively may have a holding hole configured by two elastic clamp parts that can undergo flexing deformation in a diameter expansion direction, and the fixing part may be held removably by the holder by inserting the fixing part into the holding hole for clamped engagement between the elastic clamp parts.

Any member can be used as the peripheral member provided that it is arranged in the vicinity of the wire harness in the vehicle. Thus, the peripheral member can be an electrical junction box, a holder or attachment member for another electrical component, or a duct.

The invention also relates to the holding structure for an option connector. The holder preferably includes two elastic clamp parts that clamp the fixing part of the branch line from two sides in a direction orthogonal to an axis of the branch line. Thus, the fixing part of the branch line can be held removably by the holder of the peripheral component through the simple operation of inserting the fixing part of the branch line into the gap between the opposing elastic clamp parts, thereby further improving the workability. Also, the fixing part of the branch line can be removed easily from the holder merely by pulling the fixing part of the branch line out of the gap between the opposing pair of elastic clamp parts.

The invention also may include a corrugated tube that can be fit around the branch line, and a marker indicating that the fixing part is provided at a predetermined position on the corrugated tube. The corrugated tube that is fit around the branch line reduces variation in dimensions that occur when a worker winds vinyl tape around a bundle of electrical wires, thus making it possible to hold the outer diameter of the branch line stably at a predetermined value. Thus, the fixing part is held more stably in the holder, and the branch line is fixed stably by the clamping force of the two elastic clamp parts.

A marker identifying the fixing part may be provided on the corrugated tube. Thus, the fixing part provided at a predetermined position on the branch line can be held stably by the holding part simply by inserting the marker between the two elastic clamp parts. The marker can be provided by any method, such as wrapping vinyl tape around the surface of the corrugated tube, or dyeing or roughening the surface of the corrugated tube.

A contact area of the peripheral component that contact the tip area of the branch line may be covered by a cushioning sheet to prevent abnormal noise by contact of the tip area of the branch line with the peripheral component. This also simplifies the task in comparison to attaching a urethane sheet to the surface of the option connector by winding tape around them as in conventional technology.

The holder of the option connector is provided in a peripheral component, not on the trunk line of the wire harness. Thus, the option connector can be held in a wide area and with a simple attaching task. Moreover, an area of the branch line that is a predetermined distance away from the option connector is used as the fixing part, thus avoiding abnormal noise due to contact of the option connector with the holder of the peripheral component.

DETAILED DESCRIPTION OF THE PREFERRED EMBODIMENTS

Figure 1:
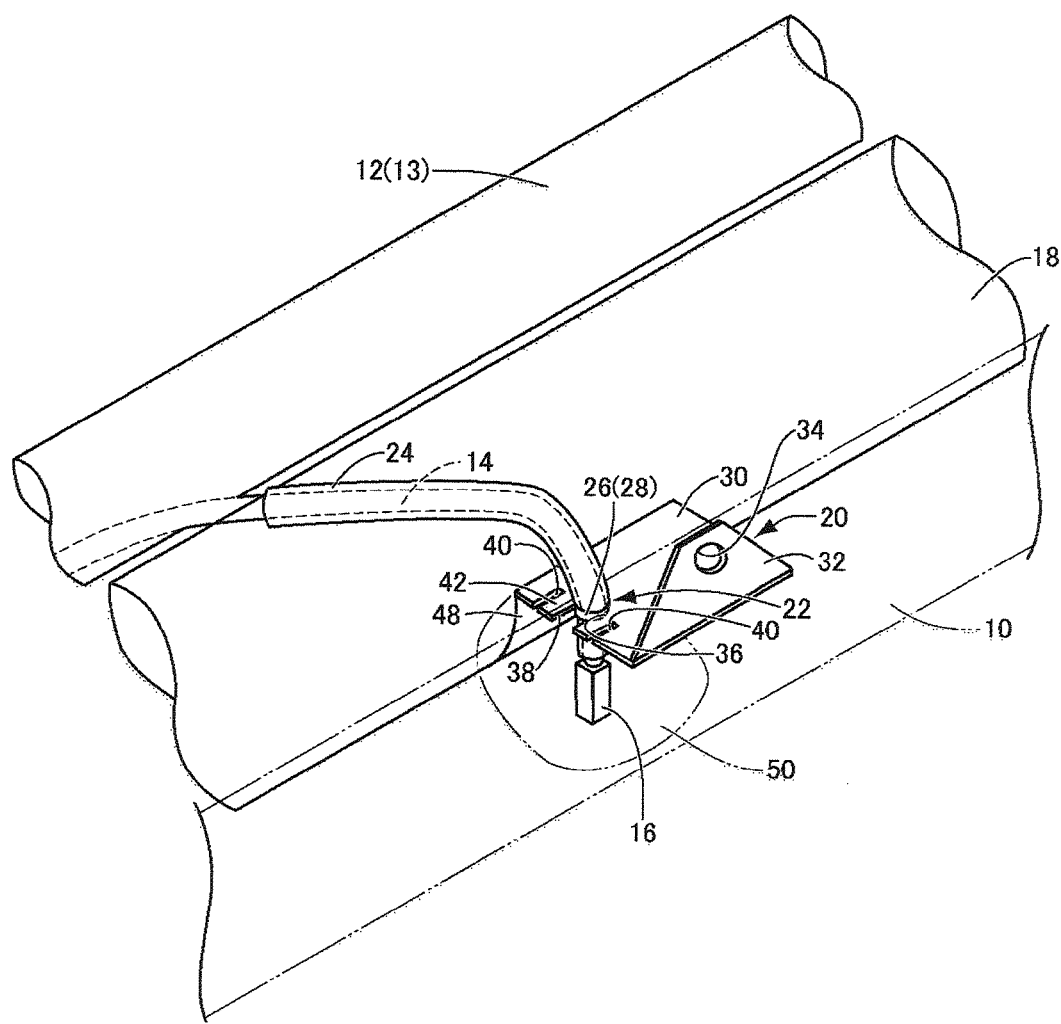
FIG. 1 is a perspective view of a holding structure for an option connector according to an embodiment of the invention.
Figure 2:
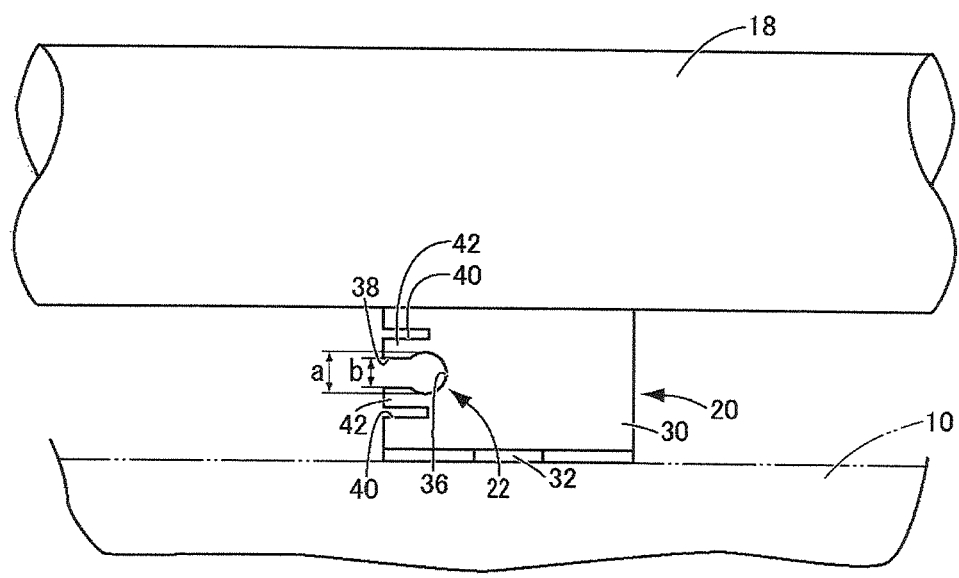
FIG. 2 is a plan view of a holder used in the holding structure for an option connector shown in FIG. 1.
Figure 3:
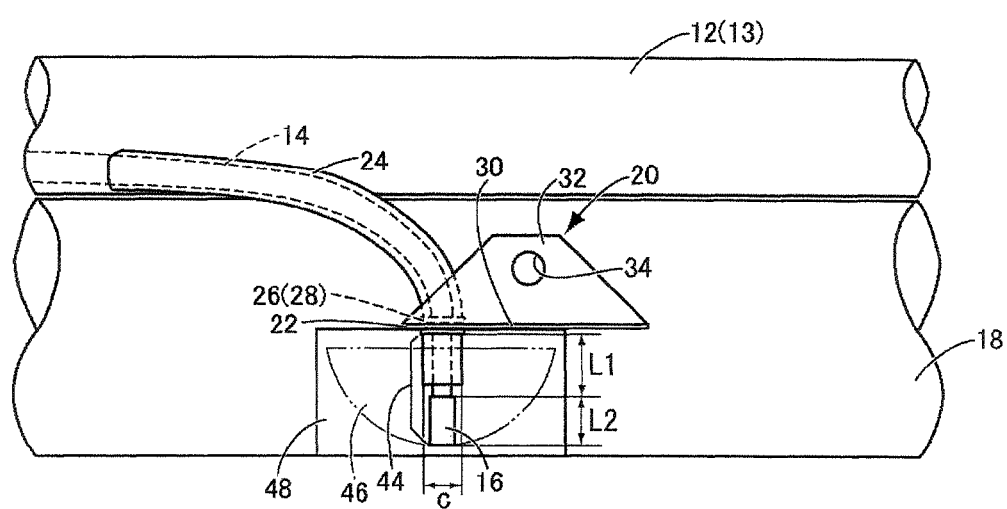
FIG. 3 is a side view of the holding structure for an option connector shown in FIG. 1.
Figure 4:
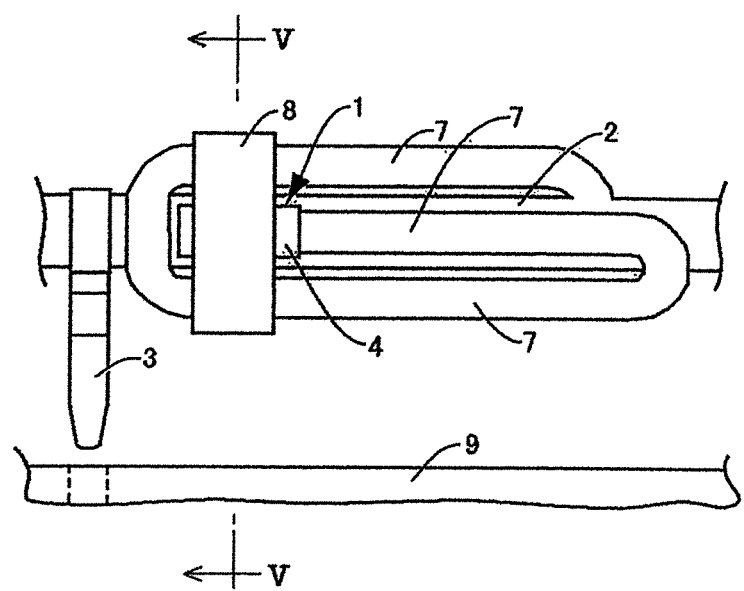
FIG. 4 is a front view of a holding structure for an option connector having a conventional structure.
Figure 5:
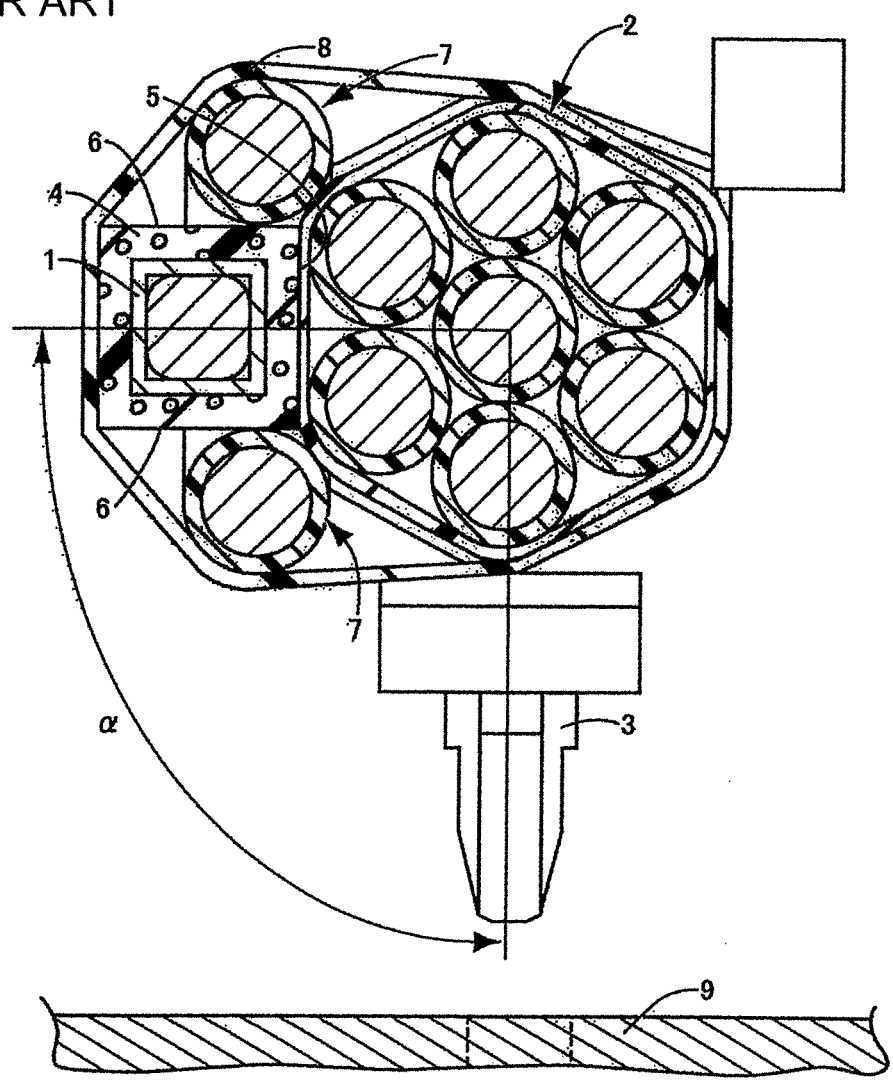
FIG. 5 is an illustrative diagram showing an enlarged view of a relevant portion of a cross-section taken along V-V in FIG. 4.

FIGS. 1 to 3 show a holding structure for an option connector according to an embodiment of the invention. As shown in FIG. 1, a vehicle 10 has a wire harness 12 that includes a trunk line 13 and a branch line 14 that branches out from the trunk line 13. An option connector 16 is provided at the end of the branch line 14. The vehicle 10 also has a duct 18 and an attachment part 20. The duct 18 is a peripheral component arranged in the vicinity of the wire harness 12. The attachment part 20 includes a holder 22 that attaches the duct 18 in a fixed position relative to the vehicle 10. In the following description, "upward" refers to the upward direction in FIG. 1, "downward" refers to the downward direction in FIG. 1, "forward" refers to the leftward direction in FIG. 1, and "backward" refers to the rightward direction in FIG. 1.

The trunk line 13 of the wire harness 12 is bundle of many covered electrical wires, and the branch line 14 is configured by branching out a predetermined group of electrical wires from the trunk line 13. The option connector 16 attached to the end of the branch line 14 is made of synthetic resin and has a substantially rectangular shape. The option connector 16 is not used in standard specifications, and is held by the holder 22 for the duct 18 without being connected to an electrical component.

A corrugated tube 24 with a known accordion-like structure is fit around the branch line 14 and fixed to the branch line 14 using vinyl tape or the like (not shown). A fixing part 26 is defined at an area of the branch line 14 that is separated from the option connector 16 by a predetermined distance. Tape 28 is wound around the outer circumferential face of the corrugated tube 24 at a site that corresponds to the fixing part 26 and defines a marker so that the fixing part 26 easily can be checked visually from above the corrugated tube 24.

The duct 18 in the vicinity of the wire harness 12 is a hollow cylinder formed from a relatively hard synthetic resin, and the attachment member 20 for attachment to the vehicle 10 projects out integrally from the outer circumferential face of the duct 18. The attachment member 20 includes a substantially rectangular base 30 that extends horizontally from an outer circumferential portion of the duct 18, and a trapezoidal vehicle attachment part 32 that extends up from an extending end of the base 30. The vehicle attachment part 32 is coupled to the vehicle 10 using a fixing bolt (not shown) inserted into a bolt insertion hole 34 that pierces the attachment member 20, and thus the duct 18 is arranged at a predetermined position in the vehicle 10.

As shown in FIG. 2, the holder 22 that holds the fixing part 26 of the branch line 14 is formed in the attachment member 20 of the duct 18. Specifically, the holder 22 has a substantially circular holding hole 36 that pierces a substantially central portion near one side (left side in FIG. 2) of the base 30 of the attachment member 20, and a substantially rectangular opening 38 extends from the holding hole 36 to the left edge of the base 30 so that the holding hole 36 opens in the forward direction (left side in FIG. 2) of the base 30. The holding hole 36 has a diameter "a" that is substantially the same as or slightly smaller than an outer diameter "c" (see FIG. 3) of the corrugated tube 24 to fit around the branch line 14 of the wire harness 12, and an opening dimension "b" of the opening 38 is smaller than the diameter "a" of the holding hole 36.

Furthermore, two notches 40 are formed in the base part 30 of the attachment member 20 at sites that are separated by a predetermined distance from the opening 38 on respective sides of the opening 38 (above and below in FIG. 2). Accordingly, two elastic clamp parts 42 are formed on respective sides of the opening part 38 and can undergo flexing deformation in the opening direction (up-down direction in FIG. 2). In this way, the holder 22 is configured such that the holding hole 36 and the elastic clamp parts 42 act cooperatively.

The above-described option connector 16 at the end of the branch line 14 of the wire harness 12 is held in the above-described holder 22 in the attachment member 20 of the duct 18. More particularly, a worker grasps the branch line 14 of the wire harness 12 and visually checks the fixing part 26 of the branch line 14 using the tape 28 that is attached to the corrugated tube 24 fit around the branch line 14, as a marker. Next, the fixing part 26 of the branch line 14 is inserted into the gap between the opposed elastic clamp parts 42 that configure the holder 22 of the duct 18. The fixing part 26 of the branch line 14 then is pressed toward the holding hole 36 of the holding part 22 and causes the elastic clamp parts 42 to flex in the opening direction. When the fixing part 26 of the branch line 14 is pressed past the opening 38 and to the holding hole 36, the fixing part 26 of the branch line 14 is clamped by the pair of elastic clamp parts 42 from both sides in the direction orthogonal to the axial direction due to the elastic restorative force of the elastic clamp parts 42, and the fixing part 26 of the branch line 14 is held stably by the holding part 22.

The holding hole 36 is provided on the base sides of elastic clamp parts 42 and has a circular cross-section with an inner diameter "a" that is substantially the same as or slightly smaller than the outer diameter "c" of the corrugated tube 24. The opening 38 is provided at free ends of the elastic clamp parts 42 and is narrower than the holding hole 36. More particularly, the opening dimension "b" of the opening part 38 is a predetermined amount smaller than the outer diameter "c" of the corrugated tube 24. Accordingly, as long as an external force greater than or equal to a predetermined value is not applied to the branch line 14, the branch line 14 is prevented from coming out of the holder 22. Also, the branch line 14 of the wire harness 12 can be removed easily from the holder 22 of the duct 18 merely by pulling the fixing part 26 of the branch line 14 out of the gap between the opposing pair of elastic clamp parts 42 with external force greater than or equal to the predetermined value.

As shown in FIG. 3, a tip area 44 (see FIG. 3) extends out from the holder 22 while the fixing part 26 of the branch line 14 of the wire harness 12 is held by the holder 22. The tip area 44 begins at the fixing part 26 of the branch line 14, includes the option connector 16, and ends at the tip portion of the option connector 16. The outer face of the duct 18 is covered by a cushioning sheet 48 made of a known cushioning material, such as urethane, to cover a contact area 46 that has the possibility of contacting the tip area 44 of the branch line 14 of the wire harness 12. Also, a length L1 from the fixing part 26 of the branch line 14 to the base of the option connector 16 in the extending direction of the branch line 14 is greater than a length L2 of the option connector 16. Thus, noise caused by contact between the option connector 16 and the attachment member 20 is avoided when the option connector 16 is bent at the electrical wire connection portion.

As described above, the option connector 16 is not held by the trunk line 13 of the wire harness 12, but rather by the holding part 22 of the duct 18, which is a peripheral component. Accordingly, a housing/holding area 50 (see FIG. 1) for the option connector 16 is not limited to the range of the gap between the wire harness and a peripheral component as in conventional technology, and it is possible to obtain a wide area that additionally includes space on the duct 18 side, as shown in FIG. 1. Also, the holding structure for an option connector can be formed merely by cutting out a portion of the attachment member 20 of the duct 18, which is an existing peripheral component, thus eliminating the need for a new member and special preparation, and making it possible to configure the holding structure for an option connector very easily.

The fixing part 26 of the branch line 14 can be held removably by the holding part 22 of the duct 18 merely by inserting the fixing part 26 between the elastic clamp parts 42 of the duct 18 or pulling out therefrom. There is no need for a troublesome task such as surrounding the option connector with the branch line as in conventional technology, and it is possible to improve productivity significantly and to ease assembly of the wire harness. Also, there is no need for a troublesome task such as breaking vinyl tape and no production of discarded material when the option connector 16 is to be used, and the option connector 16 can be used merely by simply separating the fixing part 26 of the branch line 14 from the holding part 22.

Additionally, the outer diameter "c" of the branch line 14 can be held stably at a predetermined value by attaching the corrugated tube 24 to fit around the branch line 14. This enables stable fixing of the branch line 14 with the clamping force of the pair of elastic clamp parts 42. Furthermore, the fixing part 26 of the branch line 14 can be checked easily visually using the tape 28 on the corrugated tube 24. For this reason, the length of the tip area 44 of the branch line 14 can be maintained stably at a predetermined dimension with the simple task of inserting the tape 28 between the two elastic clamp parts 42, thus avoiding contact between the tip area 44 of the branch line 14 and another member. Note that besides the tape 28 of the present embodiment, any technique such as dyeing or roughening of the surface of the corrugated tube 24 can be employed to obtain a marker indicating the fixing part 26 on the corrugated tube 24.

Using an area of the branch line 14 that is separated from the option connector 16 by a predetermined distance as the fixing part 26 avoids the problem where abnormal noise is produced due to the option connector 16, which is formed from a relatively hard resin material, coming into contact with the base 30 of the attachment member 20 that configures the holding part 22 of the duct 18. Furthermore, even if the tip area 44 of the branch line 14 contacts the duct 18, the production of abnormal noise can be prevented since the contact area 46 on the duct 18 side is covered by the cushioning sheet 48. Additionally, it is possible to avoid interference between the option connector 16 and another member by arbitrarily adjusting the length dimension of the tip area 44 of the branch line 14 that extends out from the holding part 22 of the duct 18.

Although an embodiment of the invention has been described in detail above, the invention is not limited to this specific description. For example, a configuration is possible in which the fixing part 26 of the branch line 14 and the holding part 22 of the duct 18, which is a peripheral component, are removably held with hook-and-loop fasteners provided on their faces that come into contact with each other.

Also, the peripheral member may be any member arranged in the vicinity of the wire harness 12 in the vehicle 10, and in place of the duct 18, it is possible to employ any component such as an electrical junction box, an electrical component holder, or an attachment bracket in the vicinity.

What is claimed is:

1. A holding structure for a wire harness in a vehicle, comprising:
    a branch line extending from the wire harness, the branch line having an end spaced from the wiring harness;
    an option connector connected to the end of the branch line, the option connector having a free end opposite the branch line;
    a holder provided on a peripheral component of the vehicle in a vicinity of the wire harness, the holder including two elastic clamp parts; and
    a fixing part defined on a portion of the branch line at a predetermined distance from the option connector, the fixing part being held removably by the elastic clamp parts of the holder so that a tip area of the branch line that begins at the fixing part and includes the option connector extends out from the holding part, a distance between the fixing part and the free end of the option connector being selected to avoid contact of the option connector with the holder and the peripheral component.

2. The holding structure of claim 1, wherein the two elastic clamp parts resiliently clamp the fixing part of the branch line from two sides in a direction orthogonal to an axis of the branch line.

3. The holding structure of claim 2, wherein the holder has a hole and an opening extending from an edge of the holder to the hole, the two elastic clamp parts being defined on opposite sides of the hole and the opening.

4. The holding structure of claim 3, wherein the hole in the holder has an inner diameter less than or equal to a diameter of the fixing part of the branch line.

5. The holding structure of claim 4, wherein a minimum spacing between the elastic clamp parts at the opening is less than the inner diameter of the hole.

6. The holding structure of claim 3, wherein the holder has a base plate extending integrally from the peripheral component and an attachment plate extending from the base plate and configured for attachment to a supporting structure of the vehicle, the elastic clamp parts being formed on the base plate.

7. The holding structure of claim 1, further comprising a corrugated tube fit around the branch line, and a marker identifying the fixing part at a predetermined position on the corrugated tube.

8. A holding structure for an option connector at an end of a branch line of a wire harness in a vehicle, comprising:
    a holder provided on a peripheral component of the vehicle in a vicinity of the wire harness;
    a fixing part mounted on the branch line at a predetermined distance from the option connector, the fixing part being held removably by the holder so that a tip area of the branch line that begins at the fixing part and includes the option connector extend out from the holding part; and
    a cushioning sheet covering a contact area of the peripheral component that comes into contact with the tip area of the branch line.

9. The holding structure of claim 8, wherein the holder is integral with the peripheral component.

10. The holding structure of claim 8, wherein the two elastic clamp parts resiliently clamp the fixing part of the branch line from two sides in a direction orthogonal to an axis of the branch line.

11. The holding structure of claim 10, wherein the holder has a hole and an opening extending from an edge of the holder to the hole, the two elastic clamp parts being defined on opposite sides of the hole and the opening.

12. The holding structure of claim 11, wherein the hole in the holder has an inner diameter less than or equal to a diameter of the fixing part of the branch line.

13. The holding structure of claim 12, wherein a minimum spacing between the elastic clamp parts at the opening is less than the inner diameter of the hole.

14. The holding structure of claim 11, wherein the holder has a base plate extending integrally from the peripheral component and an attachment plate extending from the base plate and configured for attachment to a supporting structure of the vehicle, the elastic clamp parts being formed on the base plate.

15. The holding structure of claim 8, further comprising a corrugated tube fit around the branch line, and a marker identifying the fixing part at a predetermined position on the corrugated tube.

16. A holding structure for a vehicle, comprising:
    a wire harness extending in an axial direction;
    a branch line bent to extend from the wire harness, the branch line having an end spaced from the wiring harness;
    an option connector connected to the end of the branch line;
    a fixing part defined on a portion of the branch line at a predetermined distance between the wire harness and the option connector;
    a holder provided on a peripheral component of the vehicle in a vicinity of the wire harness, the holder including two elastic clamp parts that removably hold the fixing part so that the option connector and a portion of the branch line between the fixing part and the option connector are aligned transverse to the axial direction of the wire harness.

17. The holding structure of claim 16, wherein the holder has a base plate extending integrally from the peripheral component and an attachment plate extending from the base plate and configured for attachment to a supporting structure of the vehicle, the elastic clamp parts being formed on the base plate.

18. The holding structure of claim 16, further comprising a corrugated tube fit around the branch line, and a marker identifying the fixing part at a predetermined position on the corrugated tube.

19. The holding structure of claim 16, wherein the holder is integral with the peripheral component.

20. The holding structure of claim 1, wherein the holder is integral with the peripheral component.

* * * * *